United States Patent
Nakamura (12) 
(10) Patent No.: US 6,648,110 B2
(45) Date of Patent: Nov. 18, 2003

(54) DUST COVER ASSEMBLY AND METHOD OF PRODUCING THE SAME

(75) Inventor: Yorikazu Nakamura, Kasugai (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/021,578

(22) Filed: Oct. 23, 2001

(65) Prior Publication Data

US 2002/0053494 A1 May 9, 2002

(30) Foreign Application Priority Data

Oct. 25, 2000 (JP) ........................................ 2000-325455

(51) Int. Cl.$^7$ .................................................. F16F 9/38
(52) U.S. Cl. .................. 188/322.12; 267/292; 267/141; 267/153; 267/141.1; 267/293; 267/294
(58) Field of Search ................... 280/124.155, 124.177; 188/322.12, 321.11; 267/220, 34, 33, 292, 293, 294, 64.11, 35, 64.23, 64.24, 64.27, 64.19, 64.21, 122, 141, 153, 141.1–141.7; 92/51, 169.1; 277/636, 616

(56) References Cited

U.S. PATENT DOCUMENTS 5,676,355 A   10/1997  Hayashi et al. ............. 267/221
5,954,168 A  * 9/1999  Nakatani et al. ......... 188/322.12
6,042,092 A  * 3/2000  Shibata ........................ 267/122

FOREIGN PATENT DOCUMENTS

JP   57-1927    1/1982
JP   8-261267   10/1996

* cited by examiner

Primary Examiner—Douglas C. Butler
(74) Attorney, Agent, or Firm—Rossi & Associates

(57) ABSTRACT

A method of producing a dust cover assembly comprising the steps of: preparing a fixing member having a mounting bore to be fitted on a shock absorber's piston rod, and an engaging portion formed in its outer circumferential surface as an axially undercut portion; preparing a tubular parison having a large diameter portion at its one axial end portion; positioning the large diameter portion to be disposed radially outwardly of the outer circumferential surface of the fixing member; closing a blow mold to form a mold cavity around the parison and to hold the large diameter portion of the parison in close contact with the outer circumferential surface of the fixing member; and blow molding the parison by introducing a compressed gas into the blow mold through the mounting bore, thereby molding the dust cover. A dust cover assembly and a shock absorber equipped with the dust cover assembly are also disclosed.

6 Claims, 9 Drawing Sheets

DUST COVER ASSEMBLY AND METHOD OF PRODUCING THE SAME

The disclosure of Japanese Patent Application No. 2000-325455 filed on Oct. 25, 2000 including the specification, drawings and abstract is incorporated herein by reference in its entirety.

BACKGROUND OF THE INVENTION

1. Field of the Invention

The present invention relates generally to techniques associated with a dust cover to be attached to a shock absorber used in a suspension mechanism of an automotive vehicle. More particularly, the present invention is concerned with a novel dust cover assembly that permits an easy and firmly attachment thereof to the shock absorber without looseness thereof, a method of producing the dust cover assembly, and a product equipped with the dust cover assembly.

2. Description of the Related Art

There is known a shock absorber used in a suspension system of an automotive vehicle, which is interposed between and fixed to a member on the side of a body of the vehicle and a member on the side of a wheel of the vehicle so as to damp or attenuate a vibrational load applied from the wheel to the body of the vehicle. The shock absorber includes a cylinder filled with a fluid and a piston rod reciprocally slidably received by the cylinder. In the known shock absorber, a tubular dust cover is employed in order to cover a fluid-tight sealing portion between the cylinder and the piston rod. The dust cover is disposed radially outwardly of the shock absorber so as to cover a substantially entire area of a part of the piston rod that is protruded from the cylinder.

In general, the tubular dust cover is mounted on the shock absorber. For instance, JP-U-57-1927 discloses a first example of known mounting structures in which the tubular dust cover is press-fitted at its upper axial open end portion on an outer circumferential surface of a bound stopper. Furthers JP-A-8-261267 discloses a second example of known mounting structures in which a tubular dust cover made of a synthetic resin material is press-fitted at its upper axial open end portion on a fixing metal member which is fixed to a protruding end portion of the piston rod of the shock absorber.

However, the first example of the known mounting structures may give an adverse effect on the elastic property of the bound stopper, and may cause an disengagement of the dust cover from the bound stopper upon elastic deformation of the bound stopper. The second example of the known mounting structure does not ensure a firmly engagement between the dust cover made of a synthetic resin material and the rigid fixing metal member, so that the dust cover needs to be forcedly pressed on the fixing metal member by means of a snap ring or the like in order to prevent disengagement of the dust cover from the fixing metal member. This results in an increase of the number of required components and a resultant cumbersome manufacturing process. In addition, the dust cover fixed by the snap ring is likely to come loose or be disengaged from the fixing member, whereby the dust cover tends to contact or interfere with the other components, possibly causing wound or injury of the dust cover and/or other components and undesirable impact noise. In the second example of the known mounting structure, it has been proposed to employ a rubber dust cover in order to ensure the easy and firmly attachment of the dust cover to the fixing metal member. However, the rubber dust cover inevitably suffers from a problem of secular change of its property due to ozone contained in a surrounding atmosphere. This leads to a reduced elastic force of the dust cover and occurrence of ozone cracks in the rubber dust cover, possibly causing a disengagement of the dust cover from the fixing metal member. Therefore, the known mounting structures for mounting the dust cover on the shock absorber are still insufficient to ensure the ease and firmly attachment of the dust cover to the shock absorber.

SUMMARY OF THE INVENTION

It is therefore one object of this invention to provide a dust cover assembly having a dust cover made of a synthetic resin material, which permits an easy and firmly attachment of the dust cover to the shock absorber without looseness thereof.

It is another object of this invention to provide a method of producing such a dust cover assembly which permits easily and firmly attached of a dust cover to the shock absorber.

It is yet another object of this invention to provide a shock absorber equipped with such a dust cover assembly.

The above and/or other objects may be attained according to at least one of the following aspects of the invention. The following preferred forms of the respective aspects of the invention may be adopted at any possible optional combinations. It is to be understood that the present invention is not limited to the following forms or combinations of these forms, but may otherwise be recognized based on the thought of the present invention that described in the whole specification and drawings or that may be recognized by those skilled in the art in the light of the disclosure in the whole specification and drawings.

According to one aspect of the invention, it is provided a method of producing a dust cover assembly having a tubular dust cover disposed radially outwardly of a shock absorber for covering a protruding part of a piston rod of the shock absorber, said method comprising the steps of: (a) preparing a fixing member including a mounting bore to which a protruding end portion of the piston rod is inserted and fixed, and an engaging portion formed in an outer circumferential surface thereof and having an undercut shape in an axial direction thereof; (b) preparing a tubular parison having a large diameter portion at one of axially opposite end portion thereof; (c) positioning the parison with respect to the fixing member such that the large diameter portion of the parison is disposed radially outwardly of the outer circumferential surface of the fixing member including the engaging portion; (d) closing a blow mold so as to form a mold cavity around the parison and so as to hold the large diameter portion of the parison in close contact with the outer circumferential surface of the fixing member for molding the large diameter portion of the parison; and (e) executing a blow molding of the parison by introducing a compressed gas into the blow mold through the mounting bore of the fixing member, so as to form the tubular dust cover.

According to this method of the invention, when the blow molding is executed for producing the dust cover, one of the axially opposite end portions of the parison is pressed onto and held in close contact with or stick firmly to the outer circumferential surface of the fixing member including the engaging portion by the blow mold, so that one of axially opposite end portion of the dust cover is formed on and covers the outer circumferential surface of the fixing member. It is noted that the engaging portion of the fixing member has an undercut shape in the axial direction of the fixing member, in other words, the engaging portion is retracted radially inwardly from other portions of the fixing member which are located axially opposite sides of the engaging portion. The present method ensures that one of axially opposite end portions of the dust cover integrally formed with the other part of the dust cover is formed on and stick firmly to the outer circumferential surface of the radially retracted engaging portion of the fixing member, at the same time when the other part of the dust cover is produced by blow molding.

Accordingly, the present method makes it possible to fixedly mount the dust cover on the fixing member simultaneous with the blow molding of the dust cover, without requiring a special facilities or process of mounting the dust cover on the fixing member, resulting in an improved efficiency of assembling of the dust cover with the shock absorber. The present method is able to form the dust cover to be held in close contact with the outer circumferential surface of the fixing member, thus preventing looseness or disengagement of the dust cover from the fixing member at the interface between the dust cover and the fixing member, and preventing undesirable entrance of muddy water or the like into the dust cover with high stability, while assuring high fluid-tight sealing at the interface between the dust cover and the fixing member.

Moreover, the diameter of the parison is increased only at its axial end portion to be fixedly mounted on the fixing member. This arrangement facilitates a process of disposing the parison radially outwardly on the fixing member, and ensures a sufficient amount of inflation of the diameter of the parison upon blow molding the parison, making it possible to form the dust cover having a relatively small wall-thickness. For instance, the present method is able to produce with high stability the dust cover having a wall-thickness of not larger than 2.0 mm, by using commodity plastics, while minimizing occurrence of burrs.

According to one preferred form of the present method, the large diameter portion of the parison is formed by increasing a diameter of the one of axially opposite end of the parison. This method enables to thin the wall thickness of the large diameter portion of the parison, making it possible to form the dust cover on the outer circumferential surface of the fixing member with a sufficiently small wall thickness, while minimizing occurrence of burrs on the surface of the dust cover.

According to another preferred form of the present method, the fixing member is positioned and supported by a jig which protrudes axially outwardly from the fixing member, and the blow mold has a cutting protrusion, the cutting protrusion of the blow mold being brought into abutting contact with an outer circumferential surface of a portion of the jig, which portion is located axially outward of the fixing member, upon closing the blow mold, in order to cut the one of axially opposite end portion of the parison by and between the cutting protrusion and the jig, so that the fixing member is covered by the dust cover over a substantially entire area of the outer circumferential surface thereof. This method enables to form the dust cover so as to be held in contact with and cover the substantially entire area of the outer circumferential surface of the fixing member, thus preventing looseness of the dust cover from the fixing member at the interface between the dust cover and the fixing member, and the undesirable entrance of muddy water or the like into the dust cover, with further improved stability.

According to yet another preferred form of the present method, the fixing member has a bound stopper holding portion open to one of axially opposite sides thereof, the method further comprising the step of: assembling the bound stopper to the bound stopper holding portion of the fixing member, before disposing the parison radially outwardly of the outer circumferential surface of the fixing member. This method permits an easy assembling of the dust cover with the fixing member, while eliminating a cumbersome process of setting the bound stopper in the fixing member disposed inside of the dust cover through a relatively long bore of the dust cover. Upon executing the blow molding, a predetermined amount of compressed gas may be introduced into the parison through a bore of the bound stopper through which the piston rod is extended. This means that the bound stopper, which is assembled with the fixing member before mounting the dust cover on the fixing member, gives no adverse effect on efficiency of the blow molding of the dust cover.

According to another aspect of the invention, it is provided a shock absorber comprising, a dust cover assembly produced by the above described method according to the one aspect of the invention. This shock absorber prevents occurrence of looseness of the dust cover and a resultant contact or interfere of the dust cover with other components that generates undesirable impact noises. Further, the manufacture and assembling of the dust cover is effectively simplified, leading to a reduced manufacturing cost and an improved commodity value of the shock absorber.

According to yet another aspect of the invention, it is provided a dust cover assembly disposed radially outwardly of a shock absorber for covering a protruding portion of a piston rod of said shock absorber, the dust cover assembly comprising: a dust cover having a tubular shape; and a fixing member connectable to a protruding end portion of the piston rod and including a cup-shaped first metal holder and a cup-shaped second metal holder whose diameter is larger than that of the first metal holder, the first and second metal holders being superposed on and connected to each other at outer surfaces of their bottom wall portions, the first metal holder arranged for holding a rubber mount which is adapted to be held in elastic contact with a body of a vehicle, the second metal holder arranged for holding a bound stopper, one of axially opposite open end portions of the dust cover being attached to the fixing member such that the one of axially opposite open end portions of the dust cover is held in close contact with an outer circumferential surface of the second metal holder and at least a part of an outer circumferential surface of the first metal holder.

In this aspect of the invention, the one axial end portion of the dust cover is engaged with and held in contact with the portion formed between the bottom wall potions of the first and second metal holder which are superposed on and fixed to each other. This makes it possible to firmly fix and support the dust cover to and by the fixing member, while ensuring a high fluid-tight sealing between the dust cover and the fixing member.

Preferably, the dust cover is held in contact with not only the outer circumferential surface of the second metal holder but also a substantially entire area of the outer circumferential surface of the first metal holder. This ensuring further improved fluid-tight sealing between the dust cover and the fixing member.

Preferably, the dust cover may be formed by blow molding, although the dust cover may be formed by an injection molding in which a predetermined resin material is injected into a mold cavity of a mold in which the fixing member is set in a predetermined position. Since the blow molding enables to form the desired dust cover with a sufficiently small wall thickness, with high stability. Upon executing the blow molding, the large diameter portion of the parison formed at its one axial end portion is desirably held in close contact with the outer circumferential surface of the fixing member by closing and pressing the mold onto the fixing member with the large diameter portion of the parison interposed therebetween.

Further, the first metal holder may be dimensioned to have a diameter smaller than that of the second metal holder. In this arrangement, the outer surface of the bottom wall portion of the second metal holder serves as the engaging portion formed as a relatively large undercut portion in the axial direction of the fixing member, to which the dust cover is firmly adhered. Thus, the dust cover is fixedly supported by the fixing member with excellent stability.

Preferably, the first metal holder includes an outward flange integrally formed at its open end portion so as to extend radially outwardly. The dust cover may be held in contact with and cover an surface of the outward flange, whereby the dust cover is fixedly supported by the fixing member with further improved stability.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
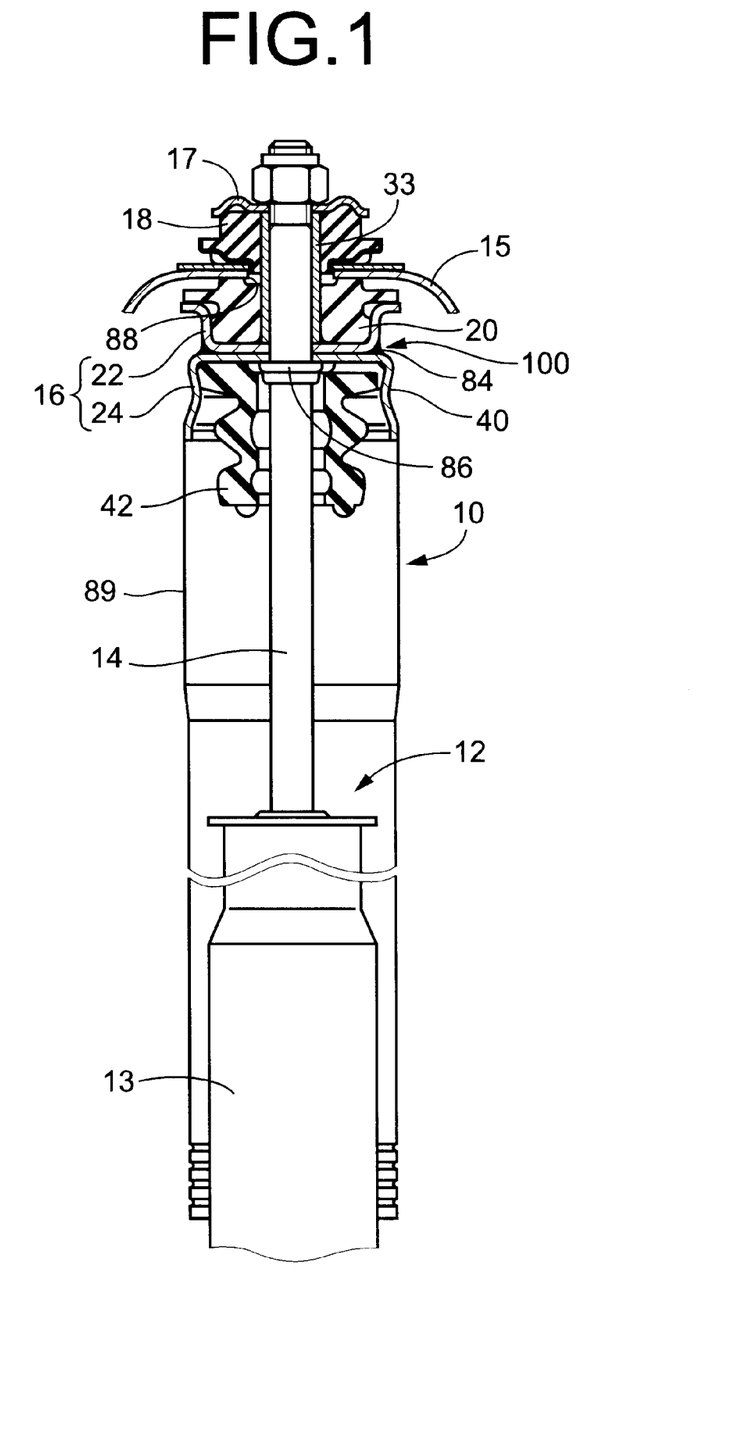
FIG. 1 is an elevational view in axial cross section of a dust cover assembly constructed according to a first embodiment of the invention, which is attached to a shock absorber of a vehicle.

Referring first to FIG. 1, there is shown a dust cover assembly including a tubular dust cover 10 and a fixing member 16 constructed according to a first embodiment of the invention. The dust cover assembly is mounted on a shock absorber 12 of a suspension system of an automotive vehicle. The shock absorber 12 has a known structure in which a cylinder 13 filled with a suitable fluid such as oil and a piston rod 14 are assembled together such that the piston rod 14 is slidably received by the cylinder 13 so as to provide a reciprocatory motion thereof in its axial direction with respect to the cylinder 13. The shock absorber 12 is installed on the vehicle such that the cylinder 13 is attached to a suspension-side member of the vehicle, e.g., a suspension arm (not shown), while the piston rod 14 is attached to a body of the vehicle, so that the piston rod 14 is axially reciprocatory moved with respect to the cylinder 13 according to a swinging motion of the suspension arm. The fixing member 16 and a pressing member 17 are fixed to a protruding end portion of the piston rod 14, and equipped with a rubber mount in the form of a lower cushion rubber 20 and an upper cushion rubber 18. In the presence of the fixing and pressing members 16, 17, the piston rod 14 is elastically connected to the body 15 via the lower and upper cushion rubbers 18, 20. The fixing member 16 also functions to provide a portion on which one axial end portion (i.e., an upper axial end portion as seen in FIG. 1) of the dust cover 10 is radially outwardly disposed and fitted. Thus, the dust cover 10 is attached to the fixing member 16 so as to extend axially downwardly for covering a protruded portion of the piston rod 14 over its substantially entire axial length and the cylinder 13 over its axially upper end portion as seen in FIG. 1.

Figure 2:
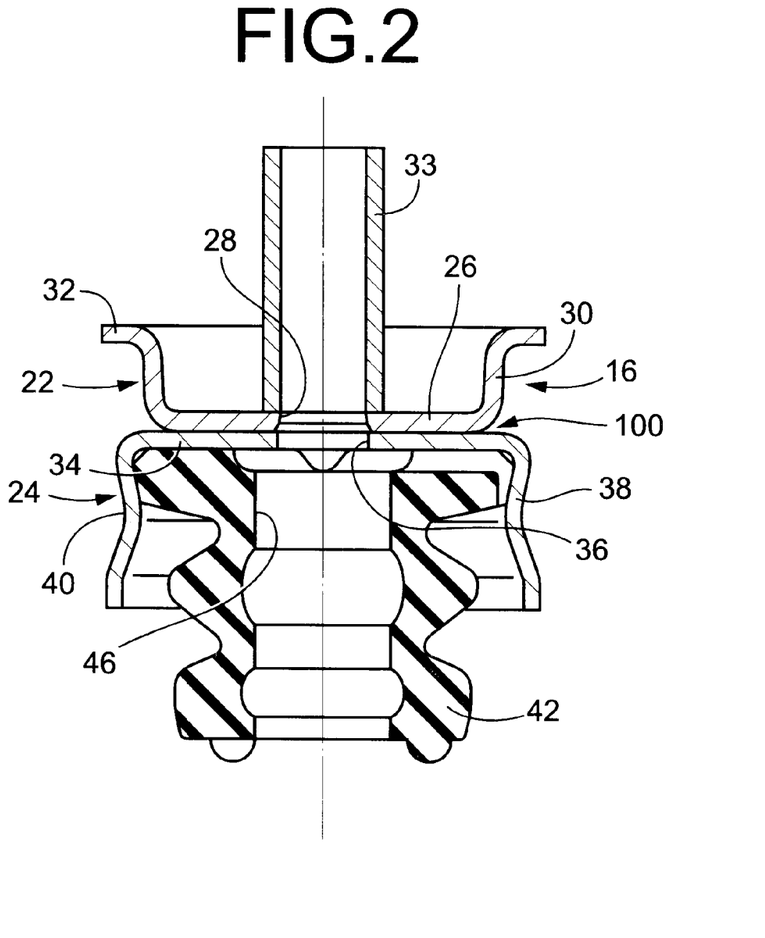
FIG. 2 is an enlarged view in vertical or axial cross section of a fixing member of the dust cover assembly of FIG. 1, which is assembled with a bound stopper.

Hereinafter, there will be described in detail a method of producing the dust cover assembly. Initially the fixing member 16 is prepared as shown in FIG. 2. The fixing member 16 is made of a rigid metallic material and includes a first metal holder in the form of an upper metal holder 22 and a second metal holder in the form of a lower metal holder 24. The upper metal holder 22 is a cylindrical cup shaped member including a bottom wall portion 26 having a through hole 28 at its central portion and a cylindrical wall portion 30 having an outward flange 32 integrally formed at its open end portion so as to extend radially outwardly. A cylindrical sleeve 33 made of metal and having a small diameter is fixed to the bottom wall portion 26 of the upper metal holder 22 such that one of axially opposite open-end faces of the cylindrical sleeve 33 is superposed on and welded to an peripheral portion of the through hole 28 of the bottom wall portion 26. Thus, the cylindrical sleeve 33 is held in a substantially concentric or coaxial relationship with the upper metal holder 22 and protrudes axially outwardly (upwardly) from the cylindrical wall portion 30. In this condition, a bore of the cylindrical sleeve 33 is held in communication with the through hole 28.

On the other hand, the lower metal holder 24 is an inverted cylindrical cup shaped member, which has a diameter larger than a diameter of the upper metal holder 22, and which is open to one of vertically opposite sides thereof (a lower side as seen in FIG. 1) that is remote from the upper metal holder 22. The lower metal holder 24 includes a top wall portion 34 (as a bottom wall portion thereof) having a through hole 36 at its central portion and a cylindrical wall portion 38 whose diameter varies in its axial direction. Described in detail, the cylindrical wall portion 38 has a smallest diameter portion at its axially intermediate portion. The diameter of the cylindrical wall portion 38 is gradually increased from the smallest diameter portion in axially upward and downward directions of the cylindrical wall portion 38, so that the cylindrical wall portion 38 has an engaging portion in the form of a shallow annular recess 40 open in its outer circumferential surface and extending in its circumferential direction at its axially intermediate portion. Namely, the annular recess 40 has an undercut shape in the axial direction of the lower metal holder 24. The cylindrical wall portion 38 has a largest diameter at its open-end portion. The thus constructed upper and lower metal holders 22, 24 are superposed on each other at the bottom wall portion 26 and the top wall portion 34, and fixed together by a spot welding, such that the upper and lower metal holders 22, 24 are held in concentric with or coaxial relationship with each other and open to the axially opposite directions. In this condition, the through holes 28, 36 are connected to each other to form a mounting bore of the fixing member 16.

Figure 3:
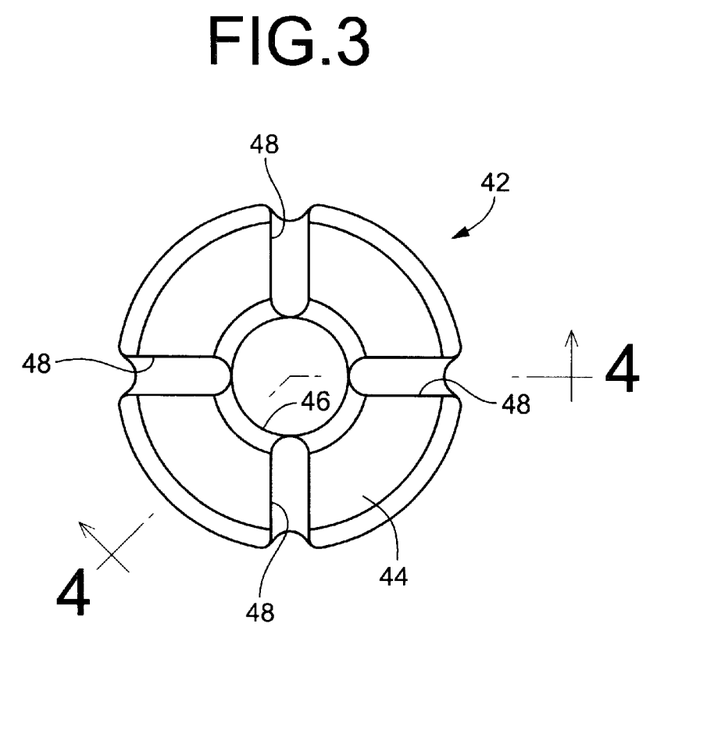
FIG. 3 is a top plane view of the bound stopper of FIG. 2.
Figure 4:
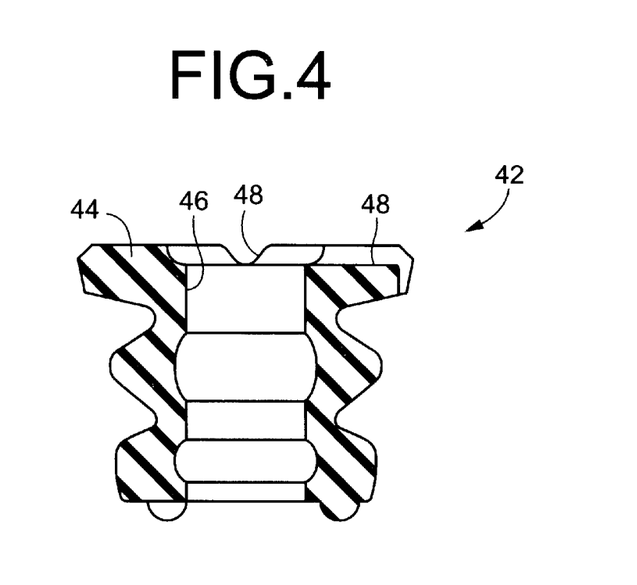
FIG. 4 is a cross sectional view taken along line 4—4 of FIG. 3.

Referring next to FIGS. 3–4, a bound stopper 42 is prepared separately. The obtained bound stopper 42 is assembled with the fixing member 16 as shown in FIG. 2. More specifically, the bound stopper 42 is a thick walled cylindrical member made of a rubber elastic body, a foamed resin elastic body or the like. The bound stopper 42 has its inner and outer diameters respectively varying in its axial direction so that the bound stopper 42 has a bellow like shape in its entirety. This arrangement is effective to suitably adjust and stabilize spring characteristics of the bound stopper 42. The bound stopper 42 has an increased outer diameter at its upper axial end portion as seen in FIG. 4, so as to provide a large diameter fixing portion 44. The bound stopper 42 and the fixing member 16 are assembled with each other such that the fixing portion 44 is superposed on and fixed to the top wall portion 34 and an axially upper end portion of an inner circumferential surface of the cylindrical wall portion 38, while being held by the smallest diameter portion of the cylindrical wall portion 38 of the lower metal holder 24. In the present embodiment, the smallest diameter portion of the cylindrical wall portion 38 serves as a bound stopper holding portion. With the bound stopper 42 held by the bound stopper holding portion, the bound stopper 42 protrudes axially downwardly from an open end of the lower metal holder 24. In this condition, a bore 46 of the bound stopper 42 is held in concentric or coaxial relationship with the through holes 28, 36 of the upper and lower metal holders 22, 24. As shown in FIG. 3, the bound stopper 42 is provided with four air vent grooves 48 each being open in an upper and an outer circumferential surfaces of the fixing portion 44, so that the bore 46 of the bound stopper 42 is held in fluid communication with an external area through the air vent grooves 48.

Figure 5:
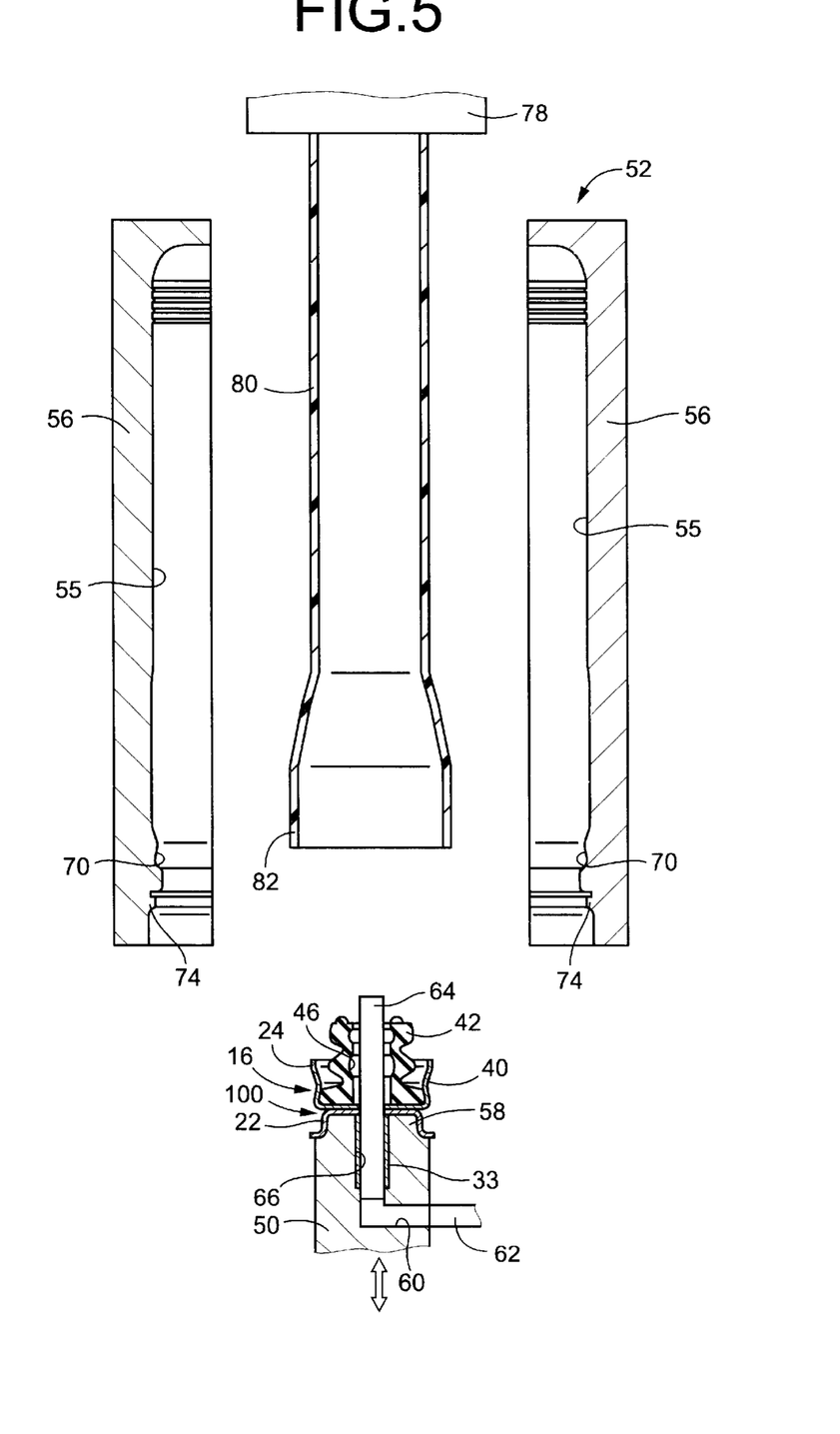
FIG. 5 is a view useful for explaining one step of a blow molding for producing the dust cover assembly of FIG. 1.

Referring next to FIG. 5, the fixing member 16 equipped with the bound stopper 42 is placed on a jig 50 to be set to a blow mold 52. The blow mold 52 is a split mold consisting of at least two divided parts in the form of a pair of mold halves 56, 56 each having a half molding surface 55. The pair of mold halves 56, 56 are butted together at their mold closing positions so as to cooperate to define therebetween a mold cavity whose surfaces, i.e., a molding surface 54 consisting of the half molding surfaces 55, 55, corresponds to an outer circumferential surface of the dust cover 10. The pair of mold halves 56, 56 are moved toward and away form each other, and are clamped on each other at their mold closing positions, by means of a suitable mold clamping device (not shown). Upon executing a blow molding, the jig 50 and the blow mold 52 are positioned to each other so that a desired blow molding product as the dust cover 10 is obtained in its inverted attitude. Therefore, the upper end portion of the blow mold 52 is designed to form the lower end portion of the dust cover 10, while the lower end portion of the blow mold 52 is designed to form the upper end portion of the dust cover 10. With the mold halves 56, 56 placed at their mold closing position, the upper end portion of the blow mold 52 is fluid-tightly closed, while the lower end portion of the blow mold 52 is opened. To this opening of the lower end portion of the blow mold 52, the fixing member 16 placed on the jig 50 is set while being suitably positioned to the mold cavity 54.

The jig 50 is a circular rod member made of metal. One of opposite axial ends (an upper axial end as seen in FIG. 5) has a configuration corresponding to an inner surface of the upper metal holder 22, to thereby providing a holding portion 58 adapted to hold the fixing member 16. The jig 50 is provided with an air inlet hole 60 formed therethrough, such that one of opposite end of the air inlet hole 60 is open in an axially intermediate portion of an outer circumferential surface of the jig 50 to be connected with an external air conduit 62, and the other end of the air inlet hole 60 is open in a central portion of the holding portion 58. A tubular member in the form of an air blow conduit 64 is pressed into the open-end portion of the air inlet hole 60 on the side of the holding portion 58 so as to extend axially outwardly (upwardly as seen in FIG. 5) from the holding portion 58. Further, the open end portion of the air inlet hole 60 on the side of the holding portion 58 has a large diameter at its axially upper end portion so as to provide a positioning bore 66 disposed radially outwardly of the air blow conduit 64 so as to axially extend by a predetermined axial distance along with the air blow conduit 64.

The fixing member 16 is superposed at its upper metal holder 22 on the holding portion 58 in the vertical direction as seen in FIG. 5, such that the air blow conduit 64 extends in the axial direction through the through holes 28, 36 of the upper and lower metal holders 22, 24 and the bore 46 of the bound stopper 42. In this condition, the cylindrical sleeve 33 is fitted in the positioning bore 66 formed in the jig 50, while the inner surface of the upper metal holder 22 is fitted on the surface of the holding portion 58, whereby the fixing member 16 is fixedly supported by and positioned to the jig 50.

The jig 50 is moved in vertically upward and downward directions as seen in FIG. 5 by means of a suitable elevating means (not shown) composing of a cylinder mechanism, a gear mechanism driven by a motor, or the like, so that the jig 50 is desirably positioned to the blow mold 52 in the vertical direction. The mold halves 56, 56 have half pressing molding surfaces 70, 70 at their axially lower end portions, respectively. With the mold halves 56, 56 placed at their mold closing position, the half pressing molding surfaces 70, 70 cooperate to define a pressing molding surface 68 whose inside diameter is slightly larger than the outer diameter of the fixing member 16. The mold halves 56, 56 further have semi-annular cutting protrusions 74, 74 respectively, which are disposed axially downward of the half pressing molding surfaces 70, 70 so as to extend radially inwardly. With the mold halves 56, 56 placed at their mold closing positions, the semi-annular cutting protrusions 74, 74 cooperate to provide an annular cutting protrusion 72 which protrude radially inwardly from the molding surface 54. Upon executing the blow molding of the dust cover 10, the mold halves 56, 56 are butted to and clamped on each other at their mold closing portions with the jig 50 interposed therebetween In this condition, an inner circumferential surface of the annular cutting protrusions 72 (i.e., inner circumferential surfaces of the semi-annular cutting protrusions 74, 74 cooperate to serve as a cutting inner surface 76) are substantially held in abutting contact with the outer circumferential surface of the jig 50 over an entire circumference of the jig 50.

Upon starting the blow molding of the dust cover 10, the pair of mold halves 56, 56 are moved away from each other in a horizontal direction as seen in FIG. 5 so as to be held in their mold opening positions, respectively, while the jig 50 holding the fixing member 16 is held in its lower position so as to dispose the fixing member 16 vertically downward of the mold halves 56, 56 as seen in FIG. 5. Further, a die 78 of a suitable extruder is disposed vertically upward of the jig 50 with a vertical distance therebetween, which distance is larger than the longitudinal length of the mold halves 56, 56. In this condition, the extruder is operated to extrude from the die 78 thereof a tubular parison 80 as a precursor of the dust cover 10 formed of a predetermined synthetic resin material. The parison 80 is formed with an inner and an outer diameter which are smaller than an inner and an outer diameters of the desired dust cover 10, respectively, and an wall thickness larger than that of the desired dust cover 10. The die 78 of the extruder supports the extruded parison 80 such that the parison 80 is sagged from the die 78 in the vertical direction as seen in FIG. 5.

The extruded parison 80 is processed for forming a large diameter portion 82 at its lower open end portion, during or after the extrusion thereof. The large diameter portion 82 of the parison 80 has a diameter which is made larger than those of the axially intermediate and upper portions of the parison 80. The large diameter portion 82 of the parison 80 may be formed by pushing a desired molding member having a conical-shape outer circumferential surface into the axially lower open end of the parison 80 which is softened by heating, for example. Further, the large diameter portion 82 of the parison 80 is arranged to have an inner diameter which is larger than the outer diameter of the fixing member 16, and a wall-thickness which is larger than that of the dust cover 10.

Figure 6:
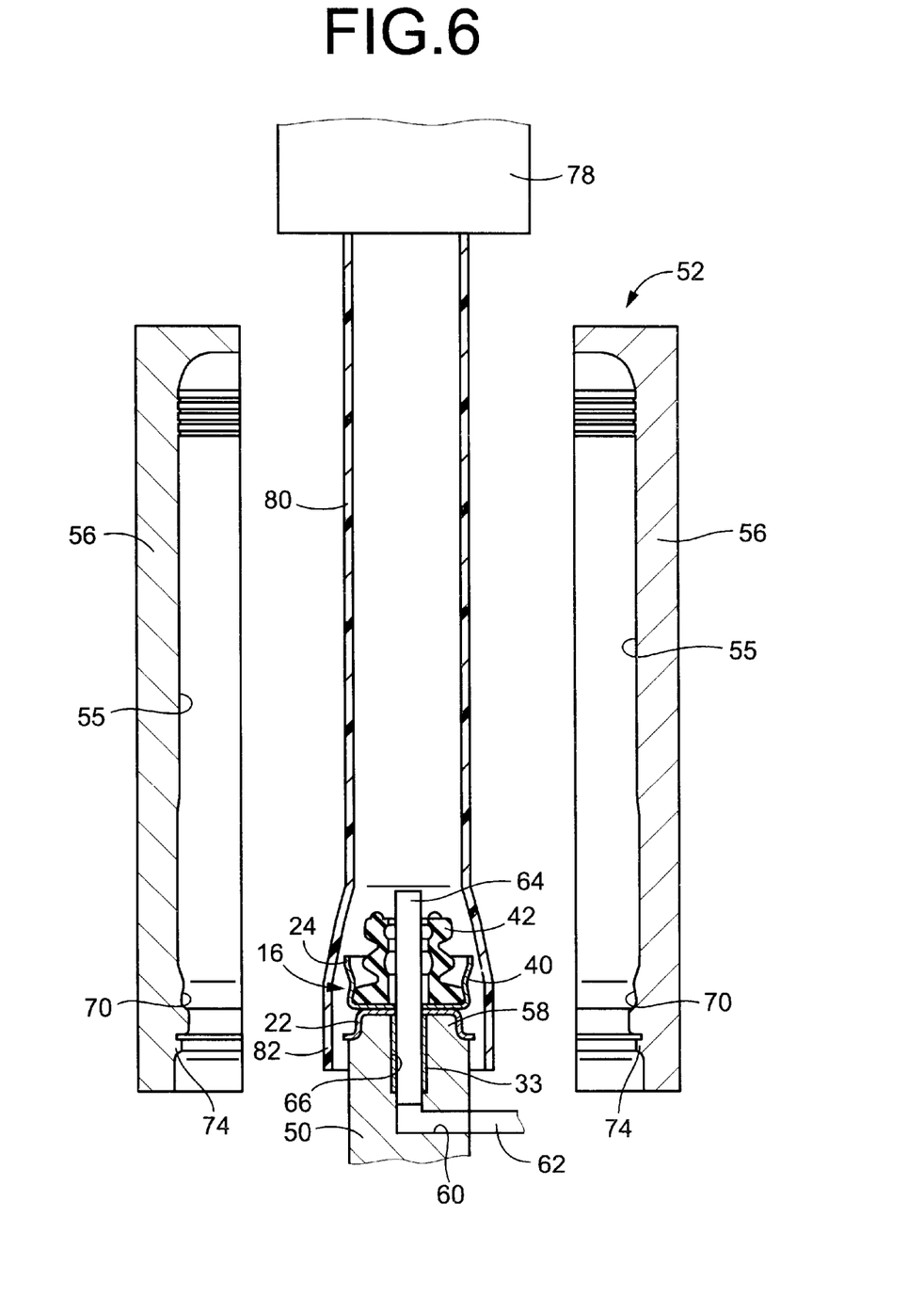
FIG. 6 is a view useful for explaining another step of the blow molding for producing the dust cover assembly of FIG. 1, which step is successive to the step of FIG. 5.

As shown in FIG. 6, after the parison 80 is extruded, the jig 50 is moved vertically upwardly so that the fixing member 16 is located radially inwardly of the large diameter portion 82 of the parison 80 and the half pressing mold surfaces 70, 70 of the mold halves 56, 56.

Figure 7:
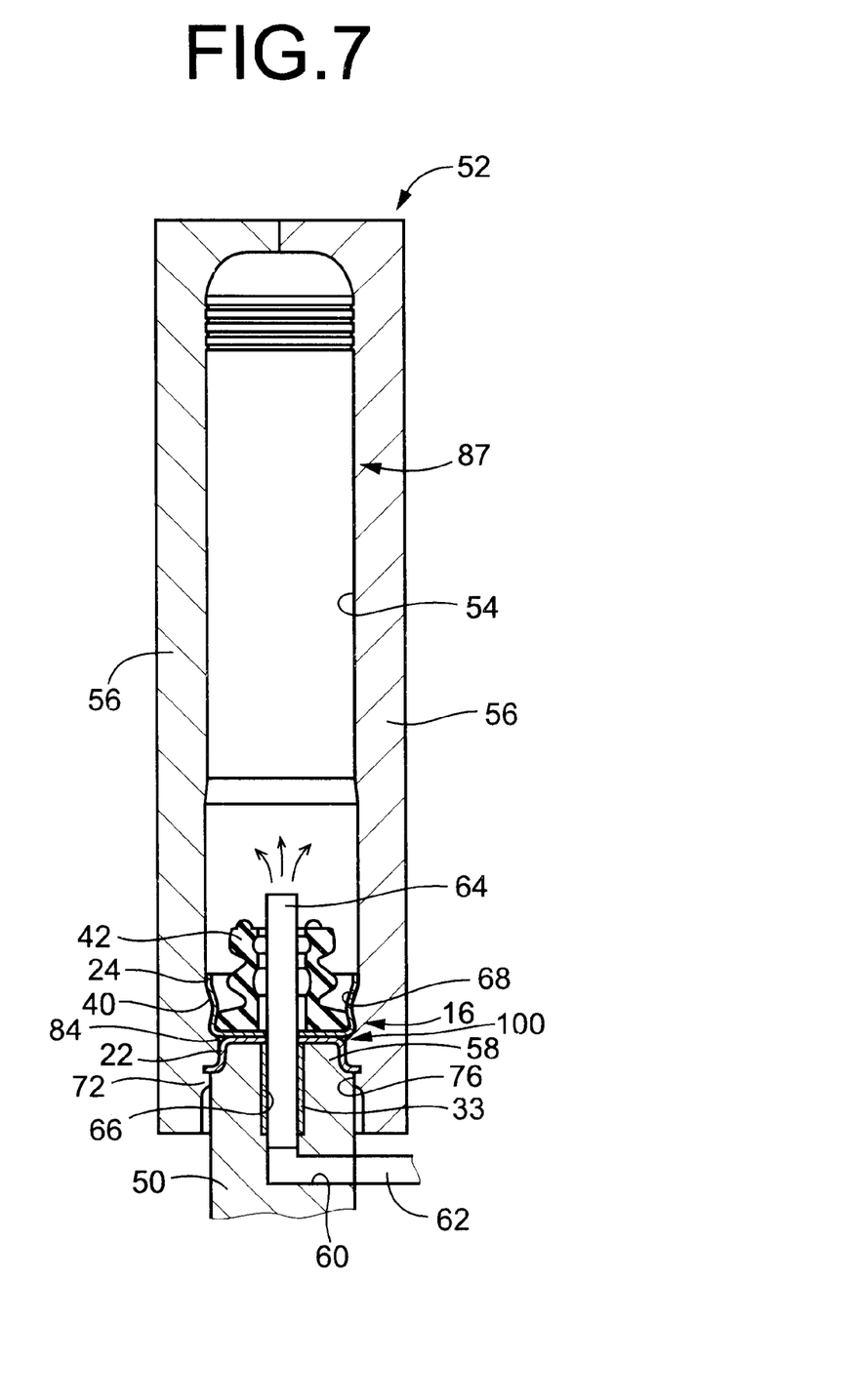
FIG. 7 is a view useful for explaining yet another step of the blow molding assembly for producing the dust cover of FIG. 1, which step is successive to the step of FIG. 6.

Subsequently, the mold halves 56, 56 are brought into abutting contact with each other at their mold closing positions, as shown in FIG. 7, and then are clamped or forcedly pressed on each other by a mold clamping force applied therebetween by the mold clamping device (not shown). Upon closing and clamping the mold halves 56, 56, the parison 80 is cut at its axially upper portion by the top wall portions of the mold halves 56, 56 which are forcedly butted together, as shown in FIG. 7. As a result, the parison 80 having a generally bag shape and being open in its lower end portion is accommodated within the mold cavity of the blow mold 52. In addition, upon closing and clamping the mold halves 56, 56, the pressing molding surface 68 consisting of the half pressing mold surfaces 70, 70 is forcedly pressed onto the large diameter portion 82 of the parison 80. In this condition, the large diameter portion 82 of the parison 80 is compressed by and between the fixing member 16 and the blow mold 52 the radial direction thereof, whereby the large diameter portion 82 of the parison 80 is adhered to the outer circumferential surface of the fixing member 16 consisting of the upper and lower metal holders 22, 24.

Accordingly, the large diameter portion 82 of the parison 80 serves as a thin-walled adhesive fixing portion 84 which is integrally formed with the axially lower open end portion of the parison 80 and adhesively fixed to the outer circumferential surface of the fixing member 16 over a substantially entire circumference of the fixing member 16. Since the annular cutting protrusion 72 (i.e., the semi-annular cutting protrusions 74, 74) are held in pressing contact with the outer circumferential surface of the jig 50 upon clamping the mold halves 56, 56 on each other, the annular cutting protrusion 72 functions to cut excess part of the parison 80, which part protrudes axially downwardly from the fixing member 16.

Then, with the closed sprit mold 56 and the jig 50 assembled with each other as described above, a compressed air is introduced into an inside of the blow mold 52 and the parison 80 through the air inlet bore 60 and the air blow conduit 64. Thus, the parison 80 is inflated against the molding surface 54 of the blow mold 52, thereby shaping the parison 80 according to the configuration of the molding surface 54. As a result, a desired blow molded product 87 as the dust cover 10 is obtained.

Figure 8:
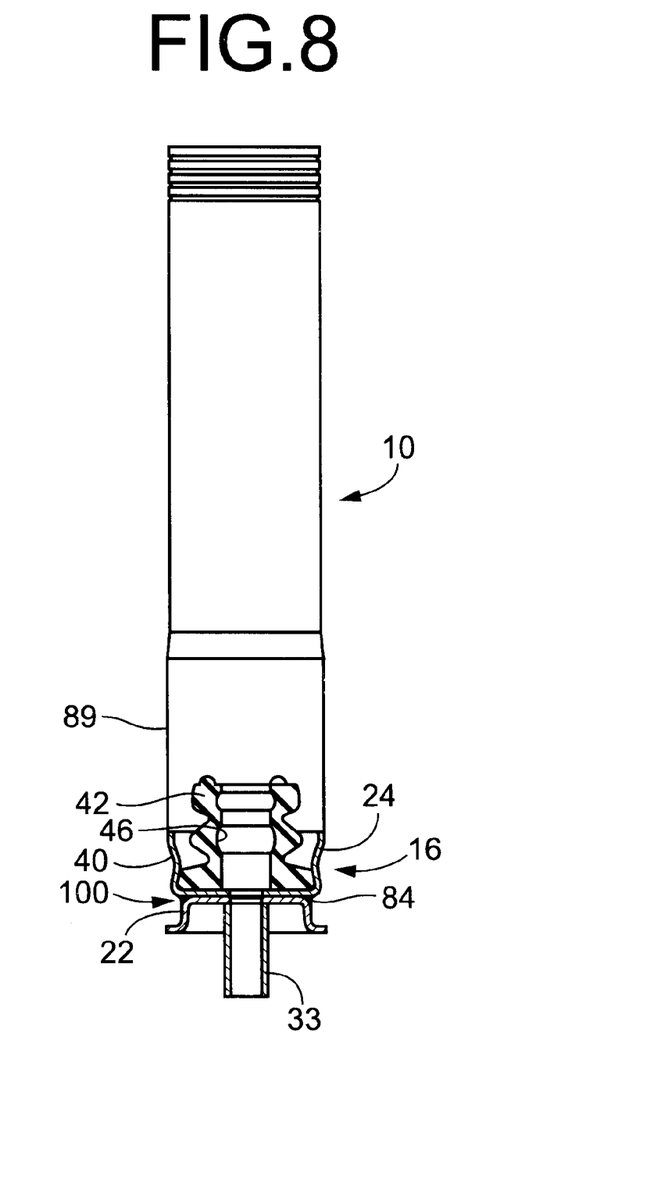
FIG. 8 is an elevational view, in vertical or axial cross section of the dust cover assembly as a molded product produced by the blow molding as shown in FIGS. 5–7.
Figure 9:
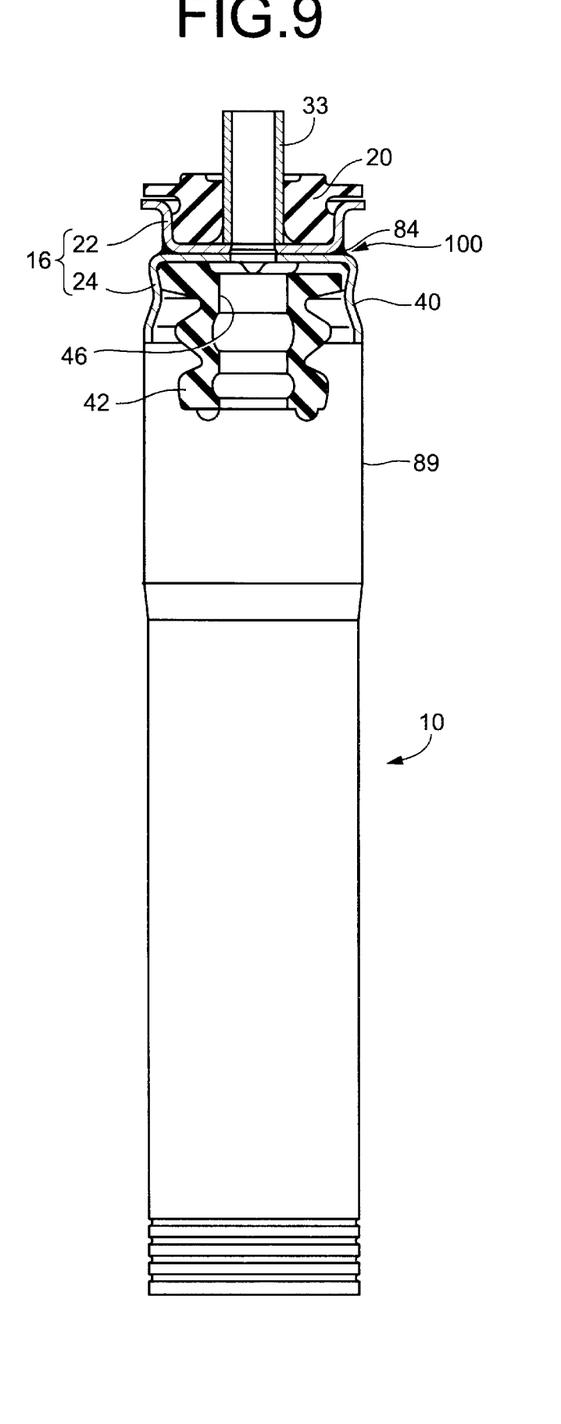
FIG. 9 is an elevational view in vertical or axial cross section of an assembly consisting of the molded product of FIG. 8 and a lower cushion rubber which are assembled to each other to be installed on an automotive vehicle.

After executing predetermined cooling and solidifying processes, the blow mold 52 is opened, to thereby release the obtained blow molded product 87 from the blow mold 52. The obtained blow molded product 87 is subjected to processes to remove burrs, as needed, and to cutoff an unnecessary closed end thereof, i.e., an unnecessary upper open end portion thereof as seen in FIG. 7. Thus, the desired dust cover 10 as shown in FIG. 8 is obtained.

The dust cover 10, i.e., the parison 80 may be made of a synthetic resin material, preferably a rigid synthetic resin material. For instance, commodity plastics including polypropylene, polyethylene and polyvinyl chloride may be suitably employed, in view of durability, impact resistance, cost of manufacture of the dust cover 10. In order to reinforce an open end portion of the dust cover 10, a plurality of grooves are formed on the open end portion of the dust cover 10 so as to extend over an entire circumference of the dust cover 10.

The dust cover assembly constructed as described above is equipped with the lower cushion rubber 20 fitted into the upper metal holder 22, and then is supplied to an assembly line for the vehicle. In the assembly line, as shown in FIG. 1, the dust cover assembly is disposed radially outwardly of the piston rod 14 of the shock absorber 12, and axially positioned to the piston rod 14 by an abutting contact of the lower metal holder 24 with an annular projection 86 formed in the shock absorber so as to 5 protrude radially outwardly from an outer circumferential surface of the piston rod 14. Further, the cylindrical sleeve 33 of the fixing member 16 is inserted through a mounting hole 88 formed through the body 15 of the vehicle, so that one axial end portion (i.e., upper axial end portion as seen in FIG. 1) of the cylindrical sleeve 33 protrudes axially upwardly from body 15 of the vehicle. To the upper axial end portion of the cylindrical sleeve 33, the upper cushion rubber 18 is fixed so as to be radially outwardly disposed on the outer circumferential surface of the cylindrical sleeve 33. The pressing member 17 bolted to the upper axial end face of the cylindrical sleeve 33 is forcedly pressed on the upper cushion rubber 18, whereby the upper cushion rubber 18 is held in pressing contact with the upper surface of the body 15 as seen in FIG. 1. In this condition, the upper axial end portion of the piston rod 14 is elastically connected to the body 15 via the upper and lower cushion rubbers 18, 20.

With the shock absorber 12 fixed to the body 15 of the vehicle as described above, the generally tubular dust cover 10 is fixedly disposed at its axially upper end portion serving as an adhesive fixing portion 84 onto the outer circumferential surface of the fixing member 16, and is supported by the fixing member 16 such that the dust cover 10 extends vertically downwardly from the fixing member 16, so as to cover the substantially entire area of the part of the piston rod 14 located outside of the cylinder 13 and the upper end portion of the cylinder continuously over their axial lengths.

According to the above-described method of producing the dust cover 10 of the present invention, the dust cover 10 is stick firmly to the fixing member 16 such that the adhesive fixing portion 84 of the dust cover 10 is held in close contact with the outer circumferential surface of the fixing member 16. In particular, the above-described method enables that the adhesive fixing portion 84 is held in close contact with the outer circumferential surfaces of the annular recess 40 and the top wall portion 34 of the under metal holder 24, which are formed as undercut portions in the axial direction of the fixing member 16.

Accordingly, the present method of producing the dust cover assembly makes it possible to attach the dust cover 10 to the fixing member 16 simultaneously with the blow molding of the dust cover 10, thus permitting an easy attachment of the dust cover 10 to the fixing member 16 without needing a special process or step for assembling the dust cover 10 to the fixing member 16. Moreover, the present method ensures the firm attachment of the dust cover 10 to the fixing member 16, thus preventing looseness or disengagement of the dust cover 10 from the fixing member 16, and accordingly eliminating entrance of muddy water or the like into the dust cover 10 through an undesirably formed gap between the dust cover 10 and the fixing member 16.

In addition, the diameter of the parison 80 is enlarged only at the one axial end portion (i.e., the lower axial end portion as seen in FIG. 5) to be disposed radially outwardly of the fixing member 16 before executing the blow molding, according to the above-described method. This arrangement is effective to thin the adhesive fixing portion 84 of the parison 80 with ease by only enlarging the diameter of the parison 80 at the lower axial end portion thereof. This arrangement is also effective to reduce the diameter of the portion of the parison 80 other than the adhesive fixing portion 84 so that the parison 80 is inflated with a sufficient amount of inflation or expansion thereof upon the blow molding, thus sufficiently thinning the blow molded product, i.e., the dust cover 10. Therefore, the present method makes it possible to produce with high stability the dust cover 10 which has a sufficiently small wall-thickness in its entirety, preferably has a wall-thickness of not larger than 2.0 mm, more preferably 1.0 mm.

Further, the bound stopper 42 is able to be fixed to the fixing member 16 before mounting the dust cover 10 on the fixing member 16, according to the present method of producing the dust cover 10, leading to an improved efficiency in mounting the dust cover 10 and the bound stopper 42 on the fixing member 16. Moreover, the present method is able to provide the dust cover 10 which is excellent in its waterproof quality, and which is free from the problem of the entrance of water and a resultant contact of the bound stopper with the entrance water, thus minimizing a possibility of deterioration of the property and durability of the bound stopper 42 due to water absorbed by the bound stopper 42.

The dust cover 10 constructed as described above is press-fitted on the outer circumferential surface of the fixing member 16, so that the inner diameter of the dust cover 10 is effectively obtained. This arrangement is effective to increase the area for accommodating the bound stopper 42, while avoiding interfere or contact of the bound stopper 42 with the dust cover 10 upon elastic deformation of the bound stopper 42, thus eliminating possible damage of the dust cover 10 due to the collision of the bound stopper 42. In particular, the dust cover 10 constructed according to the present embodiment has a large diameter tubular portion 89 at its axially upper portion as seen in FIG. 1, which is contiguous with the adhesive fixing portion 84, and which has a diameter larger than that of the axially lower portion located axially downwardly of the large diameter tubular portion 89 of the dust cover 10. This arrangement is further effective to prevent the undesirable contact between the bound stopper 42 and the dust cover 10. It is noted that the blow molding employed in the present method of producing the dust cover 10, makes it easier to form the large diameter tubular portion 89 whose diameter is larger than the lower end portion of the dust cover 10, in comparison with an injection molding.

In the dust cover 10 constructed according to the present embodiment, the upper and lower metal holders 22, 24 of the fixing member 16 are superposed on each other and cooperate to form an annular recess 100 open in the outer circumferential surface of the fixing member 16. The annular recess 100 is also filled with the parison 80 upon blow molding the dust cover 10, thus ensuring further improved fixing strength of the dust cover 10 with respect to the fixing member 16.

While the presently preferred embodiment of this invention have been described in detail, for illustrative purpose only, it is to be understood that the present invention is not limited to the details of the illustrated embodiment, but may be otherwise embodied.

For instance, the shape and structure of the fixing member functioning to support the dust cover 10 are not particularly limited, but may be suitably determined in the light of the shapes or structures of the bound stopper and/or the cushion rubber to be fixed to the fixing member and the body of the vehicle. While the fixing member is constituted by the upper and lower metal holders 22, 24 in the illustrated embodiment, the fixing member may be constituted by a single metal holder.

Figure 10:
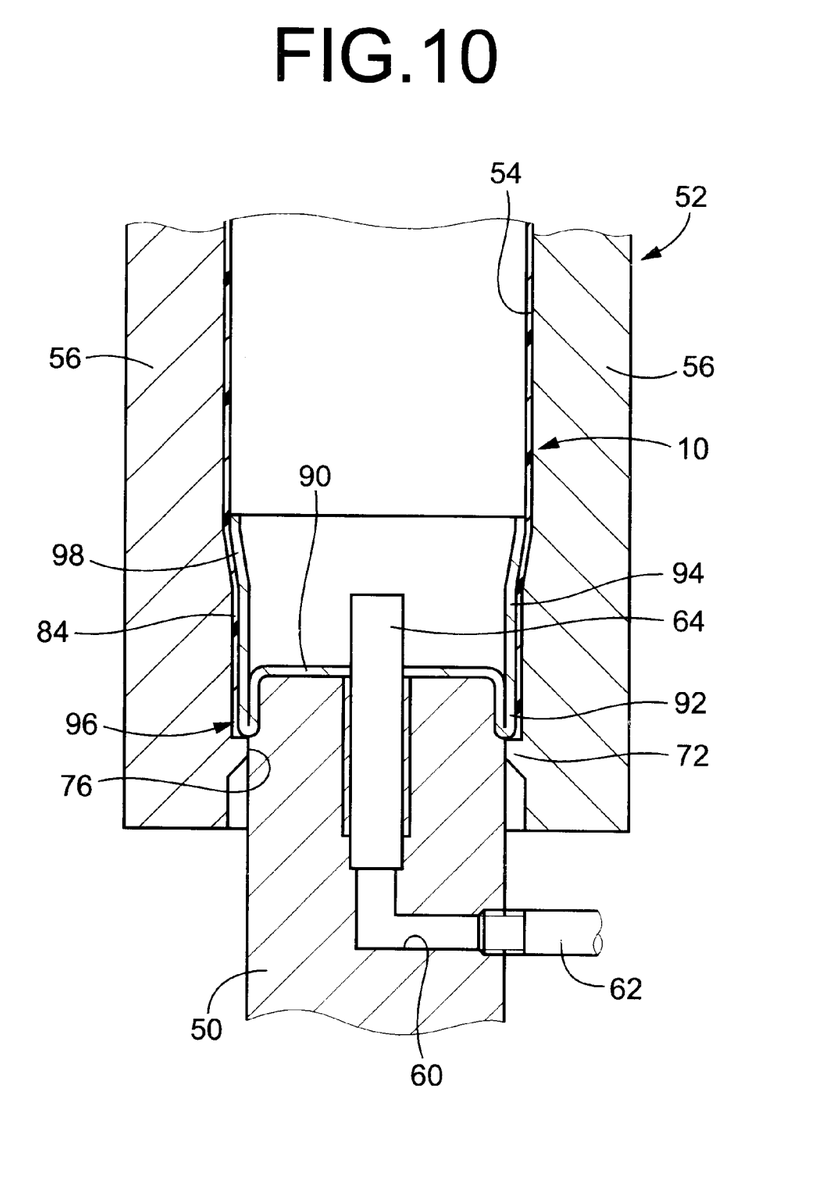
FIG. 10 is a view useful for explaining the step of the blow molding corresponding to FIG. 7, in which another type of fixing member of the dust cover assembly is employed.

More specifically described, FIG. 10 shows one example of a single metal holder 96 serves as the fixing member. In FIG. 10, the same reference numerals as used in the first embodiment will be used for identifying structurally corresponding elements and portions, of which no detailed description will be provided. The metal holder 96 is a cylindrical cup shaped member having a circular bottom wall 90. The metal holder 96 includes a first cylindrical wall portion 92 located on one of opposite sides of the bottom wall 90 (axially lower side of the bottom wall 90 as seen in FIG. 10) and a second cylindrical wall portion 94 located on the other side of the bottom wall 90 (axially upper side of the bottom wall 90 as seen in FIG. 10). The bottom wall 90 and the first and second cylindrical wall portions 92, 94 are formed integrally with each other. The second cylindrical wall portion 94 has an engaging portion 98 at its open end portion, which engaging portion 98 has a diameter gradually increased toward the open end of the second cylindrical wall portion 94. That is, the engaging portion 98 has an undercut shape in the axial direction of the metal holder 96. This engaging portion 98 of the metal holder 96 is effective to prevent a drop of the dust cover 10 attached to the metal holder 96 from the metal holder 96, while firmly supporting the dust cover 10.

In the illustrated embodiment, the dust cover 10 is fixed to the fixing member 16 so as to cover the substantially entire area of the outer circumferential surface of the fixing member 16. However, the dust cover 10 does not need to cover the entire area of the outer circumferential surface of the fixing member 16. For instance, the dust cover 10 may be fixed to the fixing member 16 so as to cover the outer circumferential surface of the lower metal holder 24 and the annular recess 100 formed by and between the upper and lower metal holders 22, 24, and so as not to cover the outer circumferential surface of the cylindrical wall portion 30 of the upper metal holder 22.

It should be appreciated that the present invention may be applicable to any dust covers used for shock absorbers of various kinds of suspension systems, e.g., a dust cover disposed within a hollow spaced of a coil spring used in one kind of shock absorber.

It is also appreciated that the mounting structure of the piston rod 14 of the shock absorber 12 with respect to the body 15 of the vehicle is not limited to that of the illustrated embodiment. For instance, the piston rod 14 may be mounted on the body 15 via a suitable bearing mechanism attached to the piston rod 14. Therefore, the upper metal holder 22 and other member relating to the upper metal holder 22, which serve for holding the cushion rubber 20, are not necessarily required, depending upon mounting structures of the piston rod 14.

Moreover, the open end portion of the dust cover 10 which is remote from the fixing member 16, may be provided with a thick-walled portion, annular ribs or the like, in order to improve a crack proof property and a strength of the dust cover 10.

In the illustrated embodiment, the lower metal holder 24 has the cylindrical wall portion 38 whose diameter is gradually increased from the smallest diameter portion or the annular recess 40 in the axially upward and downward directions. That is, the axially upper end portion of the lower metal holder 24 as seen in FIG. 1 has a funnel shape and serves as the bound stopper holding portion for firmly holding the bound stopper 42. However, the bound stopper 42 is less likely to be subjected to a pulling force in the vertically downward direction. Therefore, such a structure for holding the bound stopper 42 may be omitted, if possible.

It is also to be understood that the present invention may be embodied with various other changes, modification sand improvements, which may occur to those skilled in the art, without departing from the spirit and scope of the invention defined in the following claims.

What is claimed is:

1. A dust cover assembly disposed radially outwardly of a shock absorber for covering a protruding portion of a piston rod of said shock absorber, said dust cover assembly comprising:

a dust cover having a tubular shape; and a fixing member connectable to a protruding end portion of said piston rod and including a cup-shaped first metal holder and a cup-shaped second metal holder whose diameter is larger than that of said first metal holder, said first and second metal holders being superposed on and connected to each other at outer surfaces of their bottom wall portions, said first metal holder arranged for holding a rubber mount which is adapted to be held in elastic contact with a body of a vehicle, said second metal holder arranged for holding a bound stopper, one of axially opposite open end portions of said dust cover being attached to said fixing member such that said one of axially opposite open end portions of said dust cover is held in close contact with an outer circumferential surface of said second metal holder and at least a part of an outer circumferential surface of said first metal holder.

2. A dust cover assembly according to claim 1, wherein said second metal holder has a small diameter portion at an axially intermediate portion thereof, said small diameter portion of said second metal holder being adapted to support said bound stopper, and said one of axially opposite open end portions of said dust cover being held in close contact with an outer circumferential surface of said small diameter portion of said second metal holder.

3. A dust cover assembly according to claim 1, wherein said one of axially opposite open end portions of said dust cover is held in close contact with and covers a substantially entire area of an outer circumferential surface of said first metal holder.

4. A dust cover assembly according to claim 1, wherein said first metal holder has an outward flange integrally formed at an open end portion thereof, and said one of axially opposite open end portions of said dust cover extends to said outward flange so as to be held in contact with a substantially entire area of an outer circumferential surface of said first metal holder.

5. A dust cover assembly according to claim 1, wherein said fixing member is made of a metal and said dust cover is made of a synthetic resin material.

6. A shock absorber comprising:

a dust cover assembly including: a dust cover having a tubular shape; and a fixing member connected to a protruding end portion of a piston rod of said shock absorber and including a cup-shaped first metal holder and a cup-shaped second metal holder whose diameter is larger than that of said first metal holder, said first and second metal holders being superposed on and connected to each other at outer surfaces of their bottom wall portions, said first metal holder arranged for holding a rubber mount which is adapted to be held in elastic contact with a body of a vehicle, said second metal holder arranged for holding a bound stopper, one of axially opposite open end portions of said dust cover being attached to said fixing member such that said one of axially opposite open end portions of said dust cover is held in close contact with an outer circumferential surface of said second metal holder and at least a part of an outer circumferential surface of said first metal holder.

* * * * *